US008542406B2

(12) United States Patent
Ueda et al.

(10) Patent No.: US 8,542,406 B2
(45) Date of Patent: Sep. 24, 2013

(54) DATA PROCESSING APPARATUS CAPABLE OF CALIBRATING PRINT DATA TO REDUCE INK CONSUMPTION

(71) Applicant: Brother Kogyo Kabushiki Kaisha, Nagoya (JP)

(72) Inventors: Masashi Ueda, Nagoya (JP); Tomohiko Hasegawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/624,606

(22) Filed: Sep. 21, 2012

(65) Prior Publication Data
US 2013/0016367 A1 Jan. 17, 2013

Related U.S. Application Data

(62) Division of application No. 11/657,558, filed on Jan. 25, 2007, now Pat. No. 8,300,265.

(30) Foreign Application Priority Data

Jan. 26, 2006 (JP) ................................. 2006-018160
Jan. 26, 2006 (JP) ................................. 2006-018161

(51) Int. Cl.
G06K 1/00 (2006.01)
(52) U.S. Cl.
USPC .............................. 358/1.9; 358/1.1; 358/1.13

(58) Field of Classification Search
USPC .................... 358/1.1, 1.8, 1.9, 1.13; 347/1, 3, 347/5, 9
See application file for complete search history.

(56) References Cited

U.S. PATENT DOCUMENTS

| 5,980,012 | A * | 11/1999 | Fujita et al. ................. 347/5 |
| 6,008,812 | A | 12/1999 | Ueda et al. |
| 7,369,262 | B2 | 5/2008 | Masumoto et al. |
| 2003/0090532 | A1 | 5/2003 | Piatt et al. |
| 2003/0147091 | A1 | 8/2003 | Otokita |
| 2005/0063749 | A1 | 3/2005 | Harris et al. |
| 2007/0171245 | A1 | 7/2007 | Ueda et al. |

FOREIGN PATENT DOCUMENTS

| JP | H08-009175 A | 1/1996 |
| JP | H09-270924 A | 10/1997 |
| JP | H10-093815 A | 4/1998 |

(Continued)

OTHER PUBLICATIONS

Japan Patent Office; Office Action in Japanese Patent Application No. 2006-018160 (counterpart to the above-captioned U.S. patent application) mailed on Aug. 31, 2010. (Submitted with Parent.).

(Continued)

Primary Examiner — Thomas D Lee
(74) Attorney, Agent, or Firm — Baker Botts L.L.P.

(57) ABSTRACT

An ink reduction rate is set in accordance with the type of image and the type of recording medium. For example, when a photograph is to be printed on a glossy paper with low resolution, the ink reduction rate is set to 10%. When a photograph is to be printed on a plain paper with low resolution, the ink reduction rate is set to 25%. When a document is to be printed with low resolution, the ink reduction rate is set to 50%, irrespective of the type of recording paper.

7 Claims, 10 Drawing Sheets

(56) References Cited

FOREIGN PATENT DOCUMENTS

| JP | H11-110519 A | 4/1999 |
|----|--------------|--------|
| JP | 2001-292390 A | 10/2001 |
| JP | 2003-048340 A | 2/2003 |
| JP | 2004-110585 A | 4/2004 |
| JP | 2005-020777 A | 1/2005 |
| JP | 2005-512199 A | 4/2005 |
| JP | 2005-175650 A | 6/2005 |
| JP | 2005-335073 A | 12/2005 |
| JP | 2006-251102 A | 9/2006 |
| JP | 2006-321109 A | 11/2006 |
| JP | 2007-196529 A | 8/2007 |

OTHER PUBLICATIONS

Japan Patent Office; Office Action for Japanese Patent Application No. 2006-018161 (counterpart to the above-captioned U.S. patent application), mailed Feb. 8, 2011. (Submitted with Parent.).

Japan Patent Office; Office Action for Japanese Patent Application No. 2006-018160 (counterpart to above-captioned patent application), mailed May 31, 2011. (Submitted with Parent.).

* cited by examiner

FIG.3

| | DOCUMENT | WEB PAGE | PHOTOGRAPH | PHOTOGRAPH | SOLID BLACK |
|---|---|---|---|---|---|
| | MONOCHROME | MONOCHROME + COLOR | COLOR | COLOR | MONOCHROME |
| INK REDUCTION RATE [%] | PLAIN PAPER | PLAIN PAPER | PLAIN PAPER | GLOSSY PAPER | PLAIN PAPER |
| 0 | ○ | ○ | ○ | ○ | ○ |
| L1 | ○ | ○ | ○ | ○ | ○ |
| L2 | ○ | ○ | ○ | ○ | ○ |
| L3 | ○ | △ | △ | △ | △ |
| L4 | ○ | △ | △ | × | △ |
| L5 | ○ | △ | △ | × | △ |
| L6 | ○ | △ | × | – | × |
| L7 | △ | △ | × | × | × |
| L8 | △ | × | × | – | × |
| L9 | △ | × | × | – | × |
| L10 | × | × | × | – | × |
| L11 | × | × | × | – | × |
| L12 | × | × | × | – | × |
| L13 | × | × | × | – | × |
| L14 | × | × | × | – | × |
| L15 | × | × | × | × | × |

○ : GOOD
△ : DOUBTFUL (VALID ACCORDING TO APPLICATION)
× : UNUSABLE (OK IF DISPOSED SOON ?)
– : UNASSESSED

FIG.4

INK REDUCTION TABLE T1     UNIT: %

| PRINT DATA | PAPER | INK REDUCTION RATE | |
|---|---|---|---|
| | | LOW RESOLUTION | HIGH RESOLUTION |
| PHOTOGRAPH | GLOSSY PAPER | 10 | 5 |
| PHOTOGRAPH | PLAIN PAPER | 25 | 12.5 |
| DOCUMENT | – | 50 | 25 |

FIG.6

CALIBRATION TABLE T2

| INK REDUCTION RATE | DOCUMENT | | PHOTOGRAPH | | | |
|---|---|---|---|---|---|---|
| | | | PLAIN PAPER | | GLOSSY PAPER | |
| | X1 | Y1 | X1 | Y1 | X1 | Y1 |
| 0 | | | | | | |
| 10 | | | | | | |
| 20 | | | | | | |
| ⋮ | | | | | | |

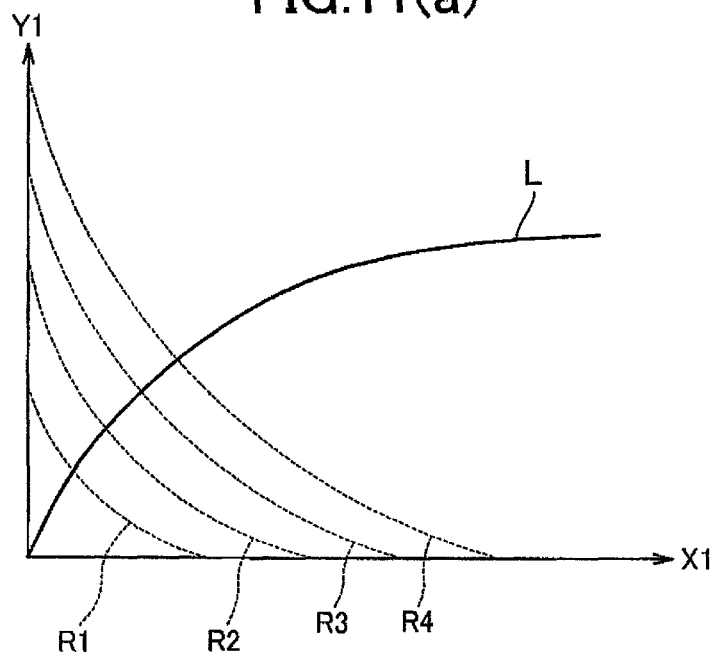

DATA PROCESSING APPARATUS CAPABLE OF CALIBRATING PRINT DATA TO REDUCE INK CONSUMPTION

CROSS REFERENCE TO RELATED APPLICATIONS

This application is a divisional application of U.S. patent application Ser. No. 11/657,558, filed on Jan. 25, 2007, which claims priority from Japanese Patent Application Nos. 2006-018160 and 2006-018161, both filed Jan. 26, 2006. The disclosures of which are incorporated herein by reference in their entirety.

TECHNICAL FIELD

The disclosure relates to a storage medium storing a data processing program and a data processing apparatus capable of reducing ink consumption by properly calibrating print data.

BACKGROUND

In recent years, digital cameras and personal computers have been widespread, and data generated by the digital cameras or the personal computers can be printed by inkjet printers or laser printers. These printers perform printing by adhering ink or toner on a recording medium, such as paper. The ink or the toner is stored in a cartridge or the like and supplied to the printers. The cartridge is replaced when the ink or the toner is consumed. In the case of large ink or toner consumption, as the frequency of replacement of the cartridge is increased, the cost for purchasing the cartridge becomes higher.

There have been proposed methods for calibrating data to be printed so as to reduce ink or toner consumption without deteriorating the quality of the data.

For example, according to a method disclosed in US 2005/0063749, data is calibrated according to an ink reduction amount set by a user and then transmitted to a printer driver, thereby reducing ink consumption in a printer.

However, even with the same ink reduction amount, the degree with which quality of printed image is deteriorated as a result of calibration varies depending on the type of image to be printed based on data (photographs taken by digital cameras or documents, for example) or the type of recording paper (glossy paper or plain paper, for example).

For example, when a large ink reduction amount is set for data for photographs or the like, a resultant image quality may be deteriorated more than expected. This may necessitate a user to reprint the same data with less ink reduction amount, ending up with larger ink consumption. On the contrary, when a small ink reduction amount is set for data for a document or the like, ink consumption may not be reduced effectively. In this manner, it is difficult for a user to set an appropriate ink reduction amount.

Also, US 2005/0063749 fails to disclose a method for setting lightness and saturation of an image to be printed when calibrating data for reducing ink consumption, and it is unclear how data is processed for reducing ink consumption.

SUMMARY

In view of the foregoing, it is an object of the invention to provide a storage medium storing a data processing program and a data processing apparatus capable of reducing ink consumption by properly calibrating data.

In order to attain the above and other objects, the invention provides a storage medium storing a data processing program including a) inputting data; b) determining an ink reduction amount based on the type of the data; and c) calibrating the data based on the ink reduction amount.

There is also provided a storage medium storing a data processing program including: a) inputting data; b) determining an ink reduction amount based on the type of recording medium onto which the data is to be printed; and c) calibrating the data based on the ink reduction amount.

There is also provided a storage medium storing a data processing program for processing data so as to reduce ink consumption. The data processing program includes: a) inputting the data; b) obtaining a lightness value and a saturation value of the data; c) detecting the type of the data; d) determining a first change value and a second change value based on the type of the data; e) changing the lightness value and the saturation value based on the first change value and the second change value, respectively; and f) calibrating the data based on the changed lightness value and the changed saturation value.

There is also provided a storage medium storing a data processing program for processing data so as to reduce ink consumption. The data processing program includes: a) inputting the data; b) obtaining a lightness value and a saturation value of the data; c) detecting the type of recording medium onto which the data is to be printed; d) determining a first change value and a second change value based on the type of recording medium; e) changing the lightness value and the saturation value based on the first change value and the second change value, respectively; and f) calibrating the data based on the changed lightness value and the changed saturation value.

There is also provided a data processing device including: an inputting unit that inputs data; a determining unit that determines an ink reduction amount based on the type of the data; and a calibrating unit that calibrates the data based on the ink reduction amount.

Theme is also provided a data processing device including: an inputting unit that inputs data; a determining unit that determines an ink reduction amount based on the type of recording medium onto which the data is to be printed; and a calibrating unit that calibrates the data based on the ink reduction amount.

There is also provided a data processing device including: an inputting unit that inputs data; an obtaining unit that obtains a lightness value and a saturation value of the data; a detecting unit that detects the type of the data; a determining unit that determines a first change value and a second change value based on the type of the data; a changing unit that changes the lightness value and the saturation value based on the first change value and the second change value, respectively; and a calibrating unit that calibrates the data, based on the changed lightness value and the changed saturation value so as to reduce ink consumption.

There is also provided a data processing device including: an inputting unit that inputs data; an obtaining unit that obtains a lightness value and a saturation value of the data; a determining unit that determines a first change value and a second change value based on the type of recording medium onto which the data is to be printed; a changing unit that changes the lightness value and the saturation value based on the first change value and the second change value, respectively; and a calibrating unit that calibrates the data based on the changed lightness value and the changed saturation value so as to reduce ink consumption.

Further, there is also provided a storage medium storing a data processing program including: a) inputting data; b) obtaining a lightness value and a saturation value of the data; c) setting an ink reduction amount; d) determining a first change value and a second change value based on the ink reduction amount with reference to a calibration table that stores the correspondence among the ink reduction amount, the first change value, and the second change value; e) changing the lightness value and the saturation value based on the first change value and the second change value, respectively; and f) calibrating the data based on the changed lightness value and the changed saturation value.

There is also provided a data processing device including: an inputting unit that inputs data; an obtaining unit that obtains a lightness value and a saturation value of the data; a first setting unit that sets an ink reduction amount; a memory that stores a calibration table; a first determining unit that determines a first change value and a second change value based on the ink reduction amount with reference to the calibration table, wherein the calibration table indicates correspondence among the ink reduction amount, the first change value, and the second change value; a changing unit that changes the lightness value and the saturation value based on the first change value and the second change value, respectively; and a calibrating unit that calibrates the data based on the changed lightness value and the changed saturation value.

BRIEF DESCRIPTION OF THE DRAWINGS

In the drawings:

FIG. 3 is a table showing assessment results of images printed based on calibrated data;

FIG. 4 is an ink reduction table according to the embodiment of the invention;

FIG. 6 is a calibration table according to the embodiment of the invention;

FIG. 8($b$) is a graph showing a nonlinear transform characteristic when lightness is corrected;

FIG. 10($b$) is a graph showing distribution of lightness of a document image;

FIG. 11($a$) is a graph showing relationship among ink reduction rates and values of X1 and Y1; and FIG. 11($b$) is a table showing extracted ink reduction rates and corresponding values of X1 and Y1.

DETAILED DESCRIPTION

Figure 1:
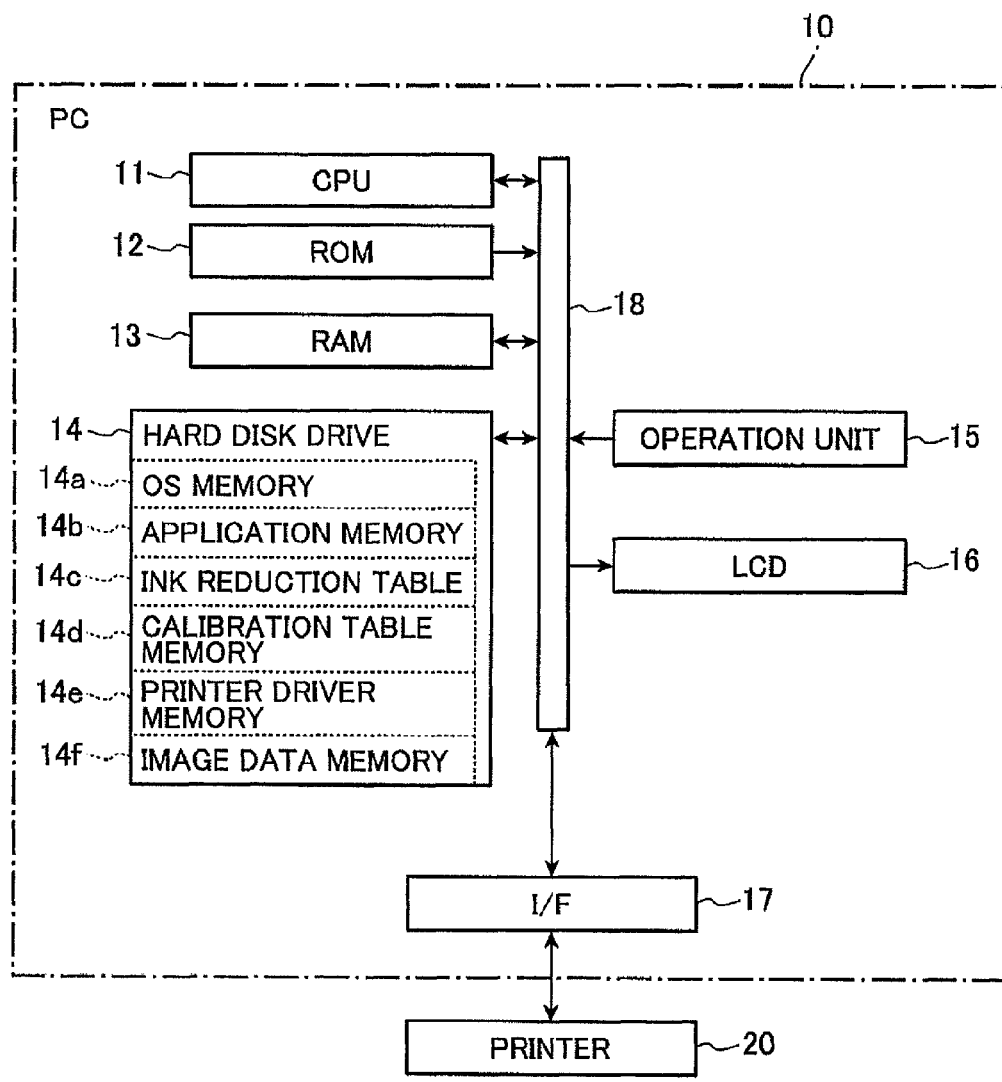
FIG. 1 is a block diagram showing electric configuration of a personal computer according to an embodiment of the invention.

A data processing program and a data processing apparatus according to an embodiment of the invention will be described while referring to the accompanying drawings wherein like parts and components are designated by the same reference numerals to avoid duplicating description.

FIG. 1 is a block diagram showing an electrical configuration of a personal computer (hereinafter referred to as "PC") 10 that functions as a data processing apparatus in which a data processing program according to the embodiment of the invention is executed.

As shown in FIG. 1, the PC 10 is connected to a printer 20 and includes a central processing unit (CPU) 11, a read-only memory (ROM) 12, a random-access memory (RAM) 13, a hard-disk drive (HDD) 14, an operation unit 15, a liquid crystal display (LCD) 16, and a printer interface (I/F) 17, all are interconnected via a bus 18.

The CPU 11 is for executing various programs stored in the ROM 12, the RAM 13, and the HDD 14. The ROM 12 stores a basic program, such as a boot program.

The RAM 13 is for temporarily storing data when the CPU 11 executes various programs. A printer driver or an application program stored in the HDD 14 is executed after transferred to the RAM 13.

The HDD 14 is a rewritable memory and includes an OS memory 14$a$ for storing an operating system run in the PC 10, an application memory 14$b$ for storing the application program, an ink reduction table memory 14$c$ for storing an ink reduction table T1 shown in FIG. 4, a calibration table memory 14$d$ for storing a calibration table T2 shown in FIG. 6, a printer driver memory 14$e$ for storing the printer driver, and an image data memory 14$f$ for storing image data.

The application program stored in the application memory 14$b$ is for executing an ink reduction process of the embodiment. In this ink reduction process, an ink reduction rate is set according to the type of image to be printed based on print data (hereinafter referred to simply as "image" or "input image"), the type of recording paper to be printed with the image, and printing resolution, with reference to the ink reduction table T1, and a print data calibration process is executed for calibrating the print data according to the ink reduction rate. Details of the ink reduction process will be described later.

The print data calibrated by the application program is input to the printer driver stored in the printer driver memory 14$e$ and subjected to proper processing by the printer driver and then output to the printer 20. More specifically, the printer driver receives values of three basic colors (RGB) of print data and executes profile conversion, color conversion for converting into print data (CMYK), and halftone processing so that the printer 20 can perform proper printing.

Although not shown in the drawings, the operation panel 15 has a keyboard and a mouse. The keyboard is for inputting characters, marks, and the like. The mouse is for instructing movement of a cursor and clicking of an icon displayed on the LCD 16. An ink reduction setting screen 28 shown in FIG. 2 is displayed on the LCD 16 so that the user can set the type of recording paper and the like through the keyboard or the mouse.

The I/F 17 is an interface such as a USB, which transmits and receives print data when printing is instructed from the PC 10.

The printer 20 is configured to print data input from the PC 10 through the I/F 17 or data stored in an external medium attached to an external medium slot (not shown) of the printer 20. Like the PC 10, the printer 20 has a microcomputer formed of a CPU and can process data stored in the external medium in the same manner as in the PC 10 and print the processed data.

Figure 2:
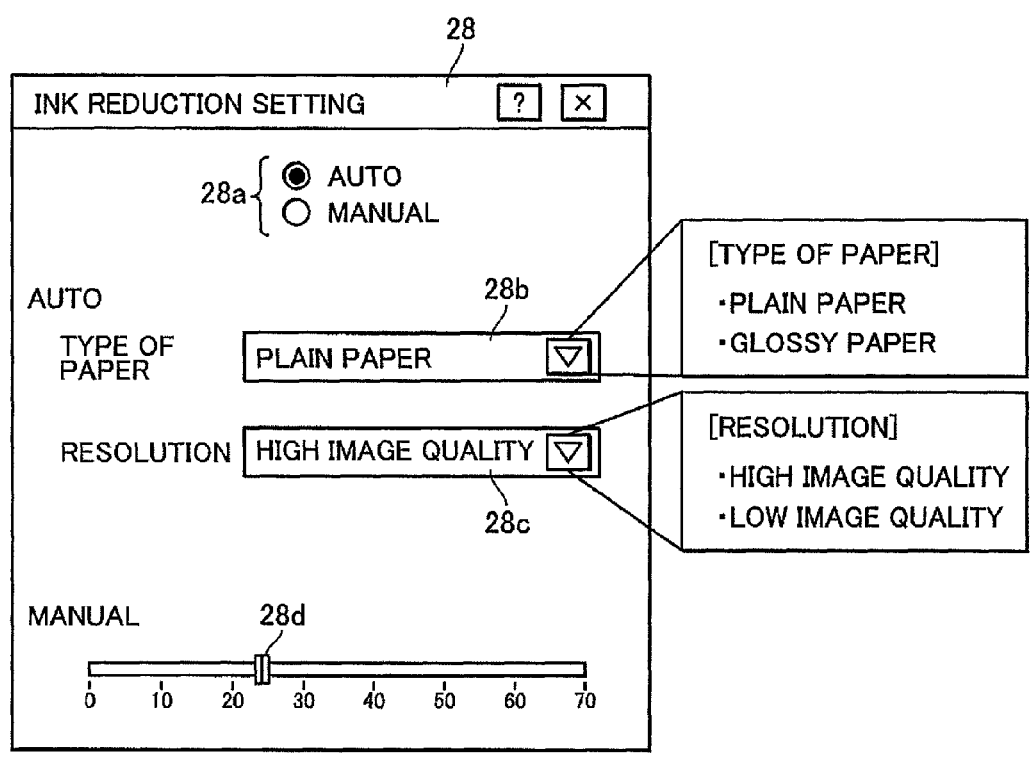
FIG. 2 is an ink reduction parameter setting screen displayed when an application program according to the embodiment of the invention is executed.

FIG. 2 shows the ink reduction parameter setting screen 28, which is displayed on the LCD 16 when the application program of the present embodiment is executed.

Displayed on the ink reduction parameter setting screen 28 are radio buttons 28a, a recording paper selection box 28b for selecting the type of recording paper, a resolution selection box 28c for selecting printing resolution, and an ink reduction rate setting slider 28d.

The user can select an auto mode or a manual mode by selecting a corresponding one of the radio buttons 28a by mouse-clicking on the radio button 28a. A black circle is displayed in the selected radio button 28a, and nothing is displayed in the unselected radio button 28a.

The recording paper selection box 28b has a display area and an icon with a turned triangle at the right end of the display area. When the icon is mouse-clicked by the user, a pull-down menu is displayed as shown in FIG. 2. The user can select one of items displayed in the pull-down menu by the cursor. In the example shown in FIG. 2, either of plain paper or glossy paper can be selected as the type of recording paper. The selected type of recording paper is displayed on the display area of the recording paper selection box 28b.

Although not shown in the drawings, the printer 20 is provided with a paper feeding unit for feeding recording paper. The user selects the type of printing paper that is set in the paper feeding unit.

The resolution selection box 28c has a display area for displaying selected printing quality and an icon for instructing display of a pull-down menu. For example, the user can select either high image quality or low image quality. The printing resolution is set to 2400 to 6000 dpi when the high image quality is selected, and the printing resolution is set to 300 to 600 dpi when the low image quality is selected, for example.

When the user selects the auto mode using the radio buttons 28a, an ink reduction rate is automatically set in accordance with the type of input image, the type of the recording paper selected using the recording paper selection box 28b, and the printing resolution (quality) selected using the resolution selection box 28c.

The type of the input image may be determined based on an extension of a filename of print data. When the input image is a document, the filename has such an extension as "txt" or "doc". When the input image is a photograph, the filename has such an extension as "Jpg". Alternatively, the type of the input image may be determined based on print data. For example, the type of the input image may be determined based on whether or not data in each region is bitmap data. In this case, even when the input image is a combination of a document and a photograph (when both the document and the photograph exist in a single page), the type of image in each region can be determined.

On the other hand, when the user selects the manual mode using the radio buttons 28a, the user can set a desired ink reduction rate by moving a knob of the ink reduction rate setting slider 28d to the right or left using the mouse. When the knob is moved to the left end of the slider 28d, the ink reduction rate is set to 0. As the knob is moved to the right, the ink reduction rate is set larger. Values displayed below the slider 28d are expressed as %.

It should be noted that the ink reduction rate means a percentage of a difference between an ink consumption with the ink reduction process of the present embodiment and an ink consumption without the ink reduction process with respect to the ink consumption without the ink reduction process.

FIG. 3 shows assessment results of various images printed on different types of recording paper with the low printing resolution and different ink reduction rates using a conventional ink reduction program. In FIG. 3, ○ indicates that the printed image is good, □ indicates that the printed image is not good but usable depending on applications, and X indicates that the printed image is unusable.

As the line goes down, the ink reduction rate (L1, L2, ...) is increased. From the left, a first column shows an assessment of a monochrome document printed on a plain paper, a second column shows an assessment of a monochrome or color web page printed on a plain paper, a third column shows an assessment of a color photograph printed on a plain paper, a fourth column shows an assessment of a color photograph printed on a glossy paper for photograph, and a fifth column shows an assessment of solid black image printed on a plain paper.

The assessment table reveals that printing can be satisfactorily performed even with the ink reduction rate of 30% when the type of image is a document, and that the ink reduction rate can be increased up to about 50% according to circumstances. Also, printing can be satisfactorily performed even with the ink reduction rate of 20% when a web page or a photograph is printed on a plain paper, and that the ink reduction rate can be increased up to about 25% according to circumstances. The ink reduction rate can be set to 10% at most when a photograph is printed on a glossy paper.

It should be noted that if printing is performed with the high printing resolution, it is preferred to further lower the ink reduction rate (desirably, 5% or less, or 0%).

Next, with reference to FIG. 4, the ink reduction table T1 will be described. The ink reduction table T1 is prepared based on the above-mentioned assessments shown in FIG. 3 and shows an ink reduction rate for each combination of the type of image, the type of recording paper, and the printing resolution. In this embodiment, as shown in FIG. 4, when a photograph is to be printed on a glossy paper with low printing resolution, the ink reduction rate is set to 10%. When a photograph is to be printed on a plain paper with low printing resolution, the ink reduction rate is set to 25%. When a document is to be printed with low printing resolution, the ink reduction rate is set to 50%, irrespective of the type of recording paper. When printing is to be performed with high printing resolution, the ink reduction rate is set to a half of on of the above-mentioned values, that is, 5%, 12.5% and 25%, respectively.

Figure 5:
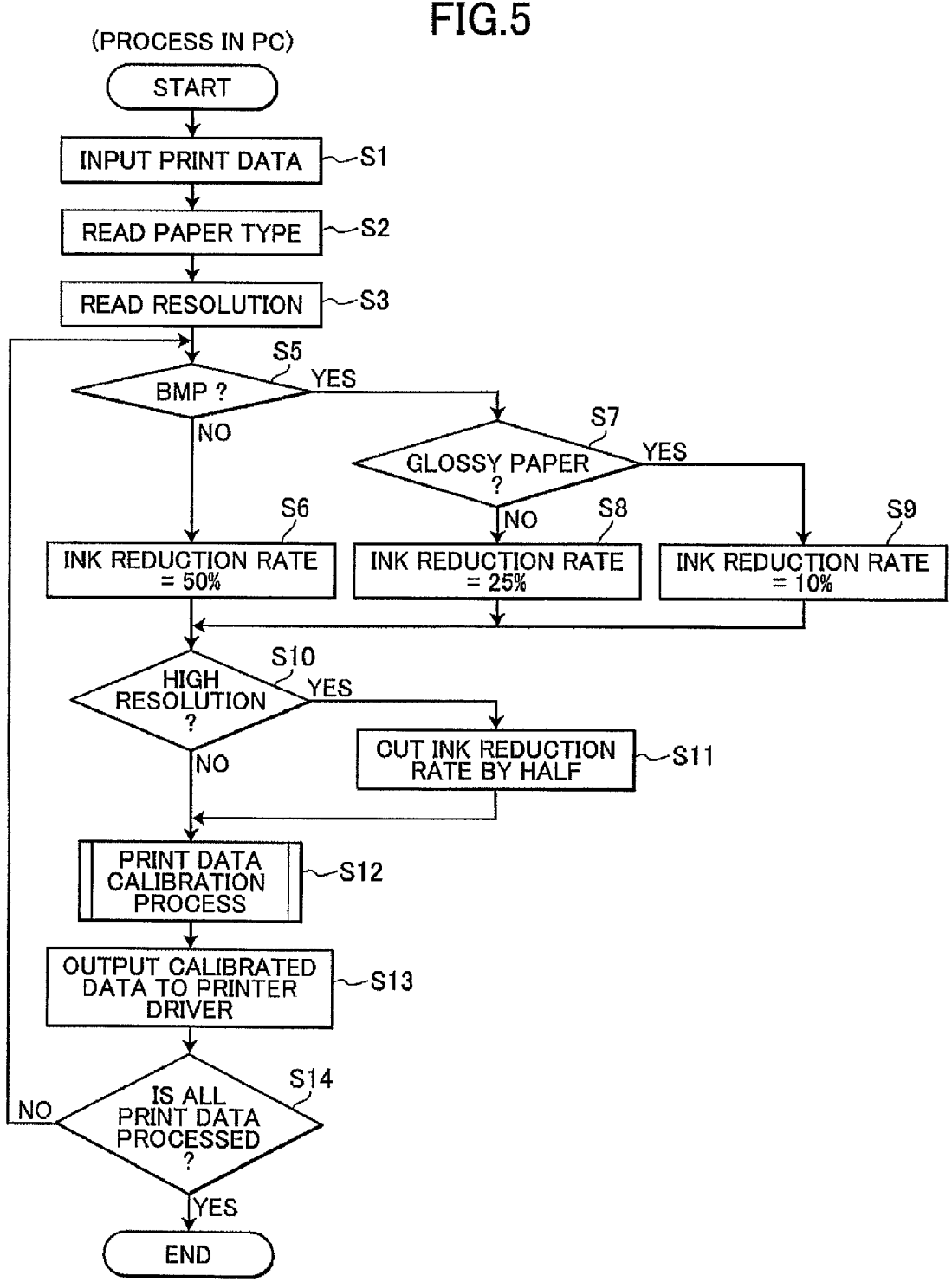
FIG. 5 is a flowchart representing an ink reduction process according to the embodiment of the invention.

Next, the ink reduction process according to the present embodiment will be described with reference to FIGS. 5 to 7. The ink reduction process to be described next is executed by the application program when the auto mode is selected on the ink reduction parameter setting screen 28 shown in FIG. 2. When the ink reduction process starts, first, print data is input (S1). It should be noted that it is only necessary to designate print data in S1 when the print data is stored in the HDD 14, and it is necessary to store print data into the image data memory 14f of the HDD 14 in S1 when the print data is transferred from a digital camera or the like through a USB interface or the like.

Next, the type of recording paper and the printing resolution set on the ink reduction parameter setting screen 28 are read (S2, S3). Then, processes in S5 to S14 are executed for each pixel of the print data.

That is, it is determined whether or not the type of the pixel image is BMP (bitmap) (S5). If not (S5: No), it is determined that the type of image is a document, and the ink reduction rate is set to 50% (S6) which is the ink reduction rate for a document with low printing resolution, with reference to the ink reduction table T1. Then, the process proceeds to S10.

On the other hand, if so (S5: Yes), it is determined that the type of image is a photograph, and it is determined whether or not the recording paper is glossy paper (S7). If not (S7: No), then the recording paper is assumed to be plain paper, and the ink reduction rate is set to 25% (S8), which is for a photograph with low printing resolution and plain paper, with reference to the ink reduction table T1. Then, the process proceeds to S10. On the other hand, if so (S7: Yes), then the ink reduction rate is set to 10% (S9), which is for a photograph with low printing resolution and glossy paper. Then, the process proceeds to S10.

In S10, it is determined whether or not the printing resolution read in S3 is high. If so (S10: Yes), then the ink reduction rate set in S6, S8, or S9 is reduced by half (S11), and the process proceeds to S12. On the other hand, if not (S10: No), then the process directly proceeds to S12. In S12, the print data calibration process to be described later is executed.

It should be noted that since ink reduction rates for high printing resolution are also stored in the ink reduction table T1 as shown in FIG. 4, the ink reduction rate may be set to a value for high printing resolution with reference to the ink reduction table T1 in S6, S8, or S9 when high printing resolution has been selected on the ink reduction setting screen 28, rather than calculating the ink reduction rate for high printing resolution based on the ink reduction rate for low printing resolution in S11.

The print data that has been subjected to the print data calibration process in S12 is output to the printer driver (S13), and it is determined whether or not entire print data has been processed (S14). If not (S14: No), then the process returns to S5. On the other hand, if so (S14: Yes), the current process ends.

It should be noted that when the manual mode has been set, after print data is input in S1, the print data calibration process in S12 is executed in accordance with the ink reduction rate that has been set on the ink reduction parameter setting screen 28. Then, the resultant print data is output to the printer driver in S13.

Next, before describing the print data calibration process, the calibration table T2 will be described in detail with reference to FIG. 6. The calibration table T2 indicates values of X1 and Y1 for changing lightness and saturation, respectively, of input image. All of these values of X1 and Y1 are positive values.

More specifically, as shown in FIG. 6, the calibration table T2 indicates, for each ink reduction rate (0, 10, 20 . . . ), values of X1 and Y1 for a document, values of X1 and Y1 for a photograph with a plain paper, values of X1 and Y1 for a photograph with a glossy paper. When a set ink reduction rate is not listed in the calibration table, such as 0, 10, or 20, values of X1 and Y1 for the set ink reduction rate can be obtained through calculation from values of X1 and Y1 for a smaller ink reduction rate listed in the calibration table T2 and values of X1 and Y1 for a larger ink reduction rate listed in the calibration table T2, according to linear interpolation using a method described later.

Next, the print data calibration process will be described with reference to the flowchart of FIG. 7. The print data calibration process is for calibrating the print data by changing lightness and saturation of input image. In the print data calibration process, first, values of X1 and Y1 corresponding to the set ink reduction rate are obtained from the calibration table T2 (S21). It should be noted that, at this time, when the type of image is a document, values of X1 and Y1 corresponding to the document are obtained. However, when the type of image is a photograph, it is determined whether the recording paper is plain paper or glossy paper, and values of X1 and Y1 corresponding to the type of recording paper are obtained.

Next, a RGB value of the input print data is converted into values of lightness L, hue H, and saturation S (S22). This conversion is performed by using following equations (1) to (3) well-known in the art.

That is, the RGB value is first converted into XYZ values represented by an XYZ colorimetric system, according to the following equation (1).

$$\begin{bmatrix} X \\ Y \\ Z \end{bmatrix} = [Mat\ 3 \times 3] \times \begin{bmatrix} R^{\gamma r} \\ G^{\gamma g} \\ B^{\gamma b} \end{bmatrix} \quad (1)$$

Here, Mat3×3 is a predetermined linear matrix, and each of γr, γg, and γb is a value of about 2.2.

Next, the XYZ values are converted into Lab values represented by a Lab colorimetric system, according to the following equations (2).

$$L = 116\left(\frac{Y}{Y_n}\right)^{1/3} - 16 \quad (2)$$

$$a = 500\left[\left(\frac{X}{X_n}\right)^{1/3} - \left(\frac{Y}{Y_n}\right)^{1/3}\right]$$

$$b = 200\left[\left(\frac{Y}{Y_N}\right)^{1/3} - \left(\frac{Z}{Z_n}\right)^{1/3}\right]$$

Here, Xn, Yn, and Zn are values of X, Y, Z, respectively, in the case of R=G=B=1. In this manner, the lightness L is obtained. The hue H and the saturation S are obtained from values of a and b according to the following equations (3).

$$H = \tan^{-1}\left(\frac{b}{a}\right) \quad (3)$$

$$S = \sqrt{a^2 + b^2}$$

Next, the value of X1 is added to the thus-converted lightness L (S23), and it is determined whether or not the value of the lightness L obtained in S23 exceeds 100, which is a maximum value of the lightness L (S24). If so (S24: Yes), then the value of the lightness L is set to 100 (S25), and the process proceeds to S26. On the other hand, if not (S24: No), the process directly proceeds to S26.

It should be noted that, in this embodiment, the lightness L is corrected by adding the value of X1 to the original lightness L. However, the present invention is not limited to this method and other methods may be appropriately used according to characteristics of each product and preference of the user.

Figure 8A:
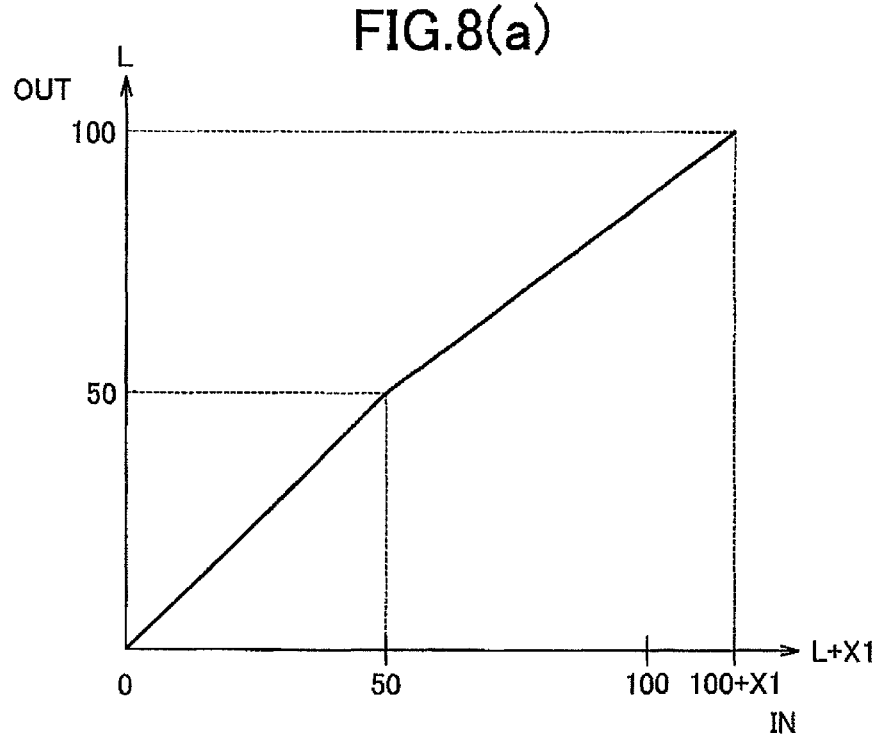
FIG. 8($a$) is a graph showing a linear transform characteristic when lightness is corrected.

For example, a linear transform characteristic as shown in FIG. 8(a) may be used. In FIG. 8(a), "L" indicates original lightness, and "OUT" indicates corrected lightness. A horizontal axis represents IN (L+X1), and a vertical axis represents OUT (output). In the characteristic shown in FIG. 8(a), L+X1 becomes OUT when L+X1 is smaller than 50, and IN (L+X1) is linearly transformed into a value between 50 and 100 when L+X1 falls between 50 and 100+X1.

Figure 8B:
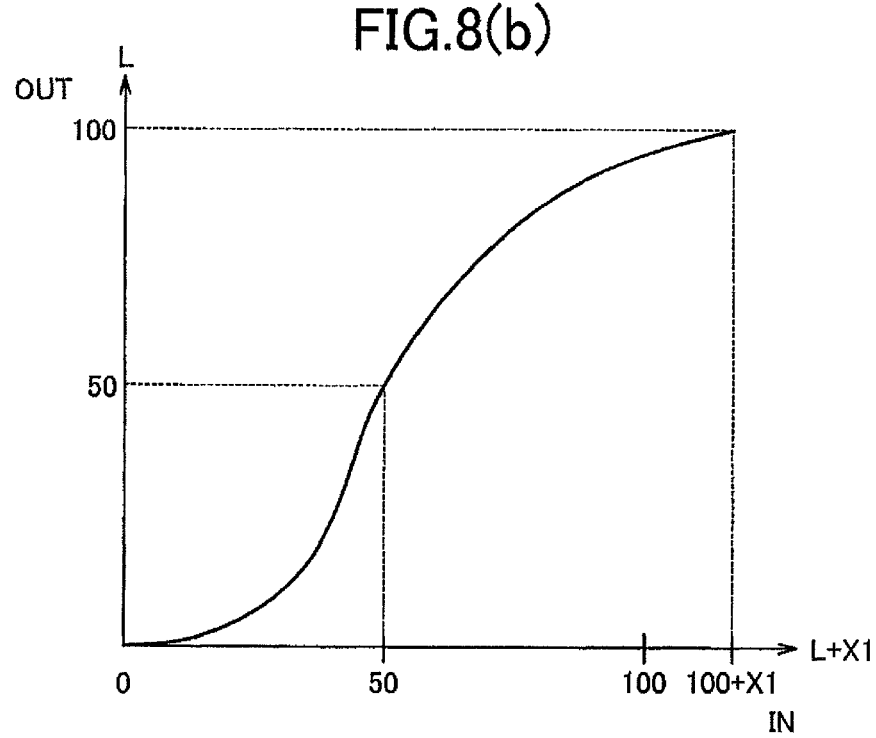

Alternatively, a nonlinear transform characteristic as shown in FIG. 8(b) may be used. In FIG. 8(b), "L" indicates original lightness, and "OUT" indicates corrected lightness.

A horizontal axis represents IN (L+X1), and a vertical axis represents OUT (output). In the characteristic shown in FIG. 8(b), OUT is obtained accordance with the nonlinear transform characteristic using a following equation (4) when L+X1 is smaller than 50.

$$\text{OUT} = 100 \times \left\{ 0.5^{(1-\gamma)} \times \left(\frac{\text{IN}}{256}\right)^{\gamma} \right\} \quad (4)$$

However, OUT is obtained according to the nonlinear transform characteristic using a following equation (5) when L+X1 falls between 50 and 100+X1.

$$\text{OUT} = 100 \times \left\{ 1 - (1 - 0.5)^{(1-\gamma)} \times \left(1 - \frac{\text{IN} + X1}{256 + X1 \times 2}\right)^{\gamma} \right\} \quad (5)$$

Next, the value of Y1 is subtracted from the saturation S (S26), and it is determined whether or not the value of the saturation S obtained in S26 is smaller than 0, which is a minimum value of the saturation S (S27). If so (S27: Yes), the value of saturation S is set to 0 (S28), and the process proceeds to S29. On the other hand, if not (S27: No), then the process proceeds directly to S29. It should be noted that the value of saturation S may be corrected according to linear or nonlinear transform characteristic in the same manner as for the lightness L.

The value of H remains unchanged and is converted back to the values of RGB based on the corrected values of lightness L and saturation S by inverse operation using following equations (6) (S29).

$$a = S \times \cos H \quad (6)$$
$$b = S \times \sin H$$
$$Y = \left(\frac{L+16}{116}\right)^3 \times Yn$$
$$X = \left\{\frac{a}{500} + \left(\frac{Y}{Yn}\right)^{\frac{1}{3}}\right\}^3 \times Xn$$
$$Z = \left\{\left(\frac{Y}{Yn}\right)^{\frac{1}{3}} - \frac{b}{200}\right\}^3 \times Zn$$
$$\begin{bmatrix} R' \\ G' \\ B' \end{bmatrix} = [Mat\ 3 \times 3]^{-1} \times \begin{bmatrix} X \\ Y \\ Z \end{bmatrix}$$
$$R = R'^{-\gamma r}$$
$$G = G'^{-\gamma g}$$
$$B = B'^{-\gamma b}$$

Then, the process returns.

In this manner, print data is calibrated in accordance with the set ink reduction rate. When the calibrated print data is processed by the printer driver and transmitted to the printer 20, printing is performed with the set ink reduction rate.

Next, a method for preparing the calibration table T2 will be described with reference to FIGS. 9 to 11. Following processes are performed for each of a document image, a photograph image with a plain paper, and a photograph image with a glossy paper.

Figure 9:
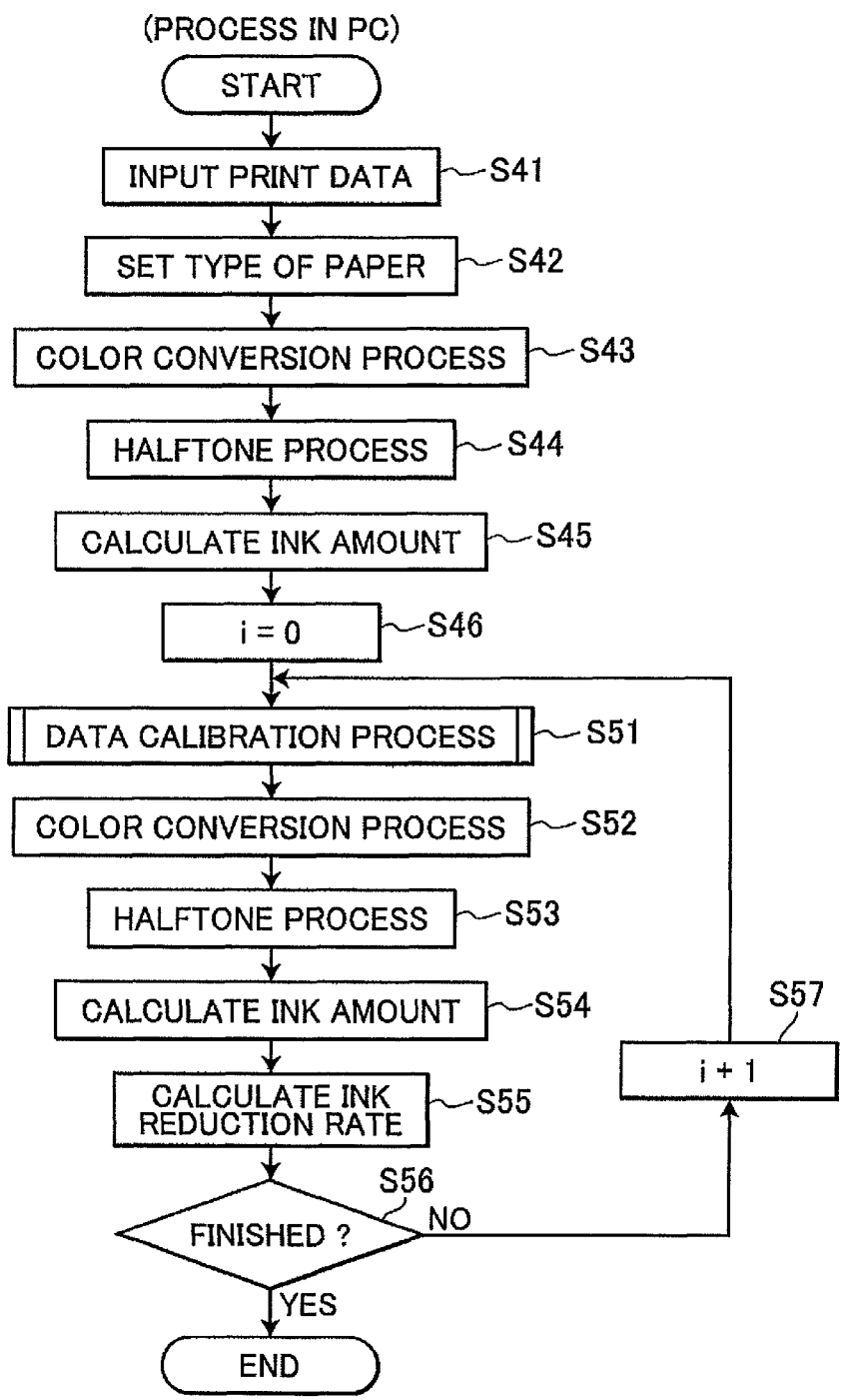
FIG. 9 is a flowchart representing an ink reduction rate calculation process according to the embodiment of the invention.

First, ink reduction rates achieved using various combinations of values of X1 and Y1 are obtained by executing an ink reduction rate calculation process shown in FIG. 9. In this process, first, print data for a general image (general photograph image or general document image) is input (S41). Here, the general photograph image and the general document image are defined as follows.

Figure 10A:
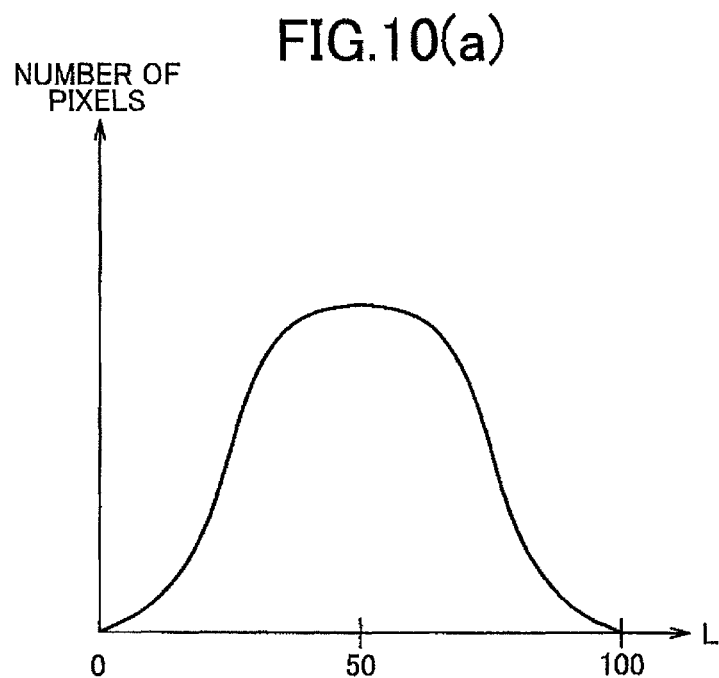
FIG. 10($a$) is a graph showing distribution of lightness of a photograph image.
Figure 10B:
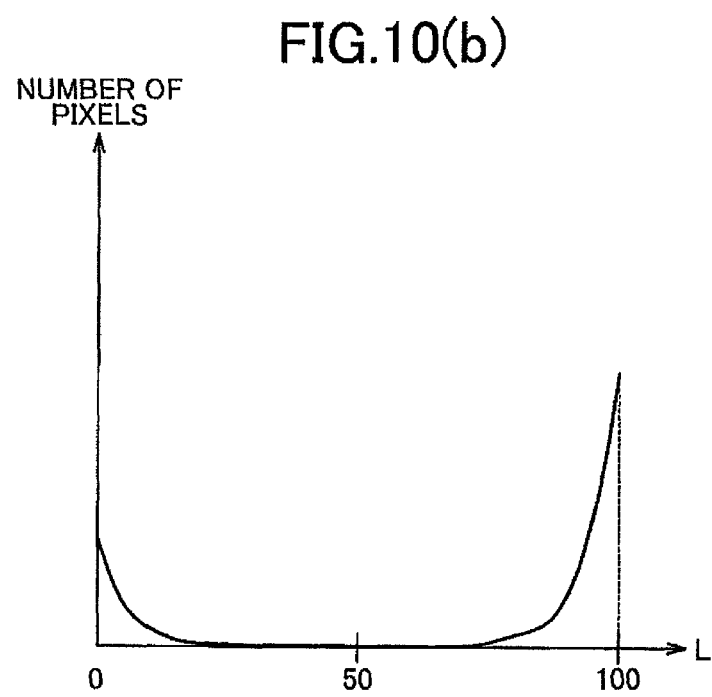

FIG. 10(a) is a graph showing distribution of lightness of the general photograph image, and FIG. 10(b) is a graph showing distribution of lightness of the general document image. In these graphs shown in FIGS. 10(a) and 10(b), a horizontal axis represents lightness and a vertical axis represents the number of pixels.

The general photograph image has distribution in which an average value of lightness is 50 and a standard deviation is 30. On the other hand, the general document image has a printed area with 0 in lightness and a blank area with 100 in lightness, and the printed area occupies 5% of the entire image.

Since the average lightness of a generally used photograph image or document image is deemed to be close to achromatic color (gray), the general photograph image and the general document image used in the ink reduction rate calculation process are gray images (R=G=B) having distribution of lightness shown in FIG. 10(a) or 10(b).

Next, the type of recording paper is set (S42). Then, a color conversion process is executed for converting a RGB value of the input print data into CMYK values (S43). Since the color reproduced on a recording paper by adhesion of the same amount of ink varies depending on the type of recording paper, a conversion characteristic is prepared for each type of recording paper (plain paper and glossy paper, for example) for use in the color conversion process in S43. Thus, the color conversion can be executed according to the conversion characteristic suitable for the type of recording paper set in S42. Then, a halftone process is executed in accordance with an error diffusion method or the like (S44).

Next, a total ink amount M is calculated in S45. More specifically, after the processes in S43 and S44 are executed for all pixels of the print data, it is determined how each dot will be formed on a recording paper. In this example, it is assumed that dots are formed of three types of small, intermediate, and large dots. Then, the total numbers of the small dots, the intermediate dots, and the large dots of the entire image are obtained. An ink amount for forming each of these dots is set as, for example, 1 pl (picoliter) for the small dot, 3 pl for the intermediate dot, and 10 pl for the large dot. Thus, the total ink amount M can be calculated by multiplying the total numbers of the small dots, the intermediate dots, and the large dots by the corresponding ink amounts and adding the obtained values together (S45).

Next, a variable i is set to 0 (S46). Here, various combinations of the values of X1 and Y1 (hereinafter referred to simply as "combinations") are prepared beforehand, and the value (0, 1, 2 . . . ) of the variable i corresponds to one of the combinations. For example, the combinations of one of the values of X1 (5, 10, and 15) and one of values of Y1 (5, 10, and 15) are prepared.

Then, an ink reduction rate Ri that can be achieved by executing the ink reduction process using each combination of the values of X1 and Y1 is acquired in the processes in S51 to S56 as follows.

Figure 7:
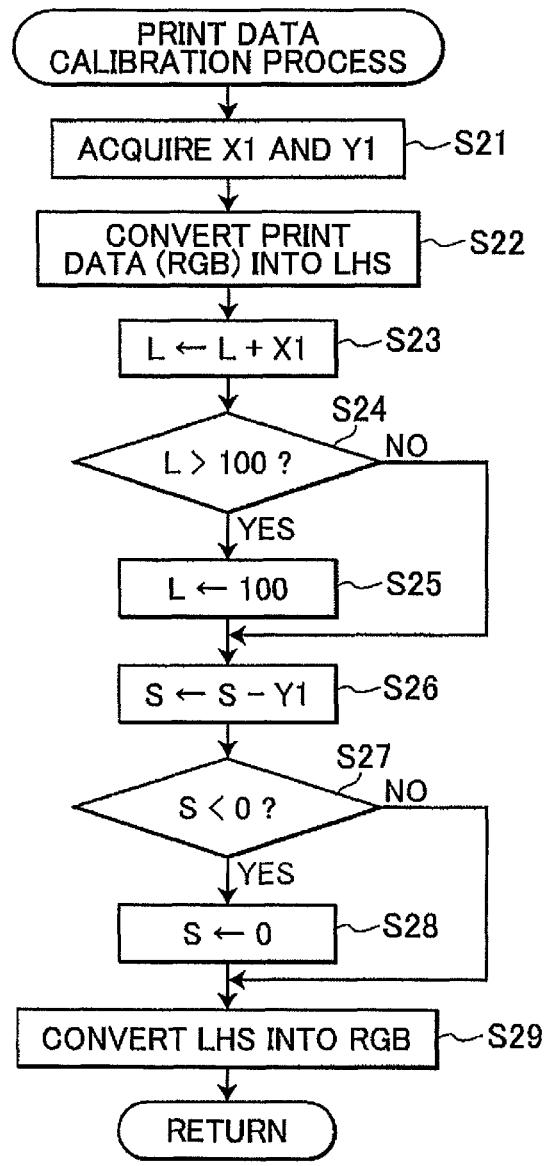
FIG. 7 is a flowchart representing print data calibration process according to the embodiment of the invention.

First, the data calibration process shown in FIG. 7 is executed with respect to the print data input in S41. It should be noted that, however, the values of X1 and Y1 used in this case are those that correspond to the value of the variable i. As a result, calibrated data with corrected lightness and saturation is obtained.

Next, the color conversion process and the halftone process are executed with respect to the calibrated data (S52, S53) in the same manner as in S43 and S44. Then, a total ink amount Mi is calculated (S54) in the same manner as in S45, and the ink reduction rate Ri is calculated using an equation: Ri=(M−Mi)/M (S55).

It is determined whether or not the processes in S51 to S55 have been executed for all of the combinations (S56). If not (S56: No), then, 1 is added to the variable i (S57), and the process returns to S51. On the other hand, if so (S56: Yes), then the current process ends.

Next, based on the relationships between the ink reduction rates Ri and the combinations obtained in the above-described ink reduction rate calculation process, a graph shown in FIG. 11(a) is obtained.

The graph shown in FIG. 11(a) shows the relationships among the ink reduction rates Ri, the values of X1, and the values of Y1. In this graph, a horizontal axis represents the value of X1, and a vertical axis represents the value of Y1.

By connecting dots representing the combinations with which the same ink reduction rate Ri can be obtained, curves R1, R2, R3, and R4 indicated by broken lines in FIG. 11(a) are obtained. The ink reduction rate becomes higher in the order of R1, R2, R3, and R4.

Then, the print data for the general image is printed after calibrated in accordance with the data calibration process using each of the combinations existing on the curved lines R1 to R4. Based on the printed images, one of the combinations with which the resultant image quality is least deteriorated as a result of the ink reduction process is identified for each ink reduction rate R1 to R4, according to a sensory test (test based on sensation) or the like. By connecting points representing thus identified combinations, a monotone increasing curve L indicated by a solid line in FIG. 11(a) is obtained. In this monotone increasing curve, absolute values of both X1 and Y1 increase with an increase in the ink reduction rate.

Based on the graph shown in FIG. 11(a), a table T3 shown in FIG. 11(b) is obtained. The table T3 shows relationship among the ink reduction rate, the value of X1, and the value of Y1 indicated by the monotone increasing curve L. Optimum values of X1, Y1 for any ink reduction rate can be obtained by interpolation from the relationship shown in the table T3. After performing the above-described processes for each of the general document image, the general photograph image with a plain paper, and the general photograph image with a glossy paper, the calibration table T2 shown in FIG. 6 can be obtained from the table T3.

As described above, according to the present embodiment, a predetermined ink reduction rate is set when an input image is a document. Also, a predetermined ink reduction rate is set according to the type of recording paper when an input image is a photograph. Further, the ink reduction rate is set smaller when high printing resolution is selected. Thus, a suitable ink reduction rate is set in accordance with the type of image, the type of recording paper, and printing resolution, without requiring a user to set an ink reduction rate in accordance with the type of image, the type of recording paper, and printing resolution.

Since the values of X1 and amount Y1 resulting in the least deterioration in image quality are obtained beforehand for each ink reduction rate, it is possible to calibrate print data so as to reduce ink consumption while suppressing deterioration in image quality.

Also, since the type of input image is automatically detected, an ink reduction rate suitable for the input image can be set without requiring a user to set the type of input image.

Since the type of input image can be detected based on the print data, an ink reduction rate suitable for the print data can be set even when the type of input image cannot be identified based on a filename of the print data. Also, since it is detected whether the type of image is a document or a photograph for each pixel of the print data, a suitable ink reduction rate can be set for each of the document and the photograph even when the input image includes both a document region and a photograph region.

Furthermore, since the calibration table T2 stores the values of X1 and Y1 whose absolute values increase with an increase in the ink reduction rate, the values of X1 and Y1 can be set to suitable values, suppressing deterioration in image quality.

While the invention has been described in detail with reference to the above embodiment thereof, it would be apparent to those skilled in the art that various changes and modifications may be made therein without departing from the spirit of the invention.

For example, in the above-described embodiment, an ink reduction rate is set in the PC 10, and lightness and saturation of image are corrected according to the ink reduction rate. However, these processes can be executed in the printer 20 by installing a corresponding program.

Also, in the above-described embodiment, an ink reduction rate is set in accordance with the type of image, the type of recording paper, and the printing resolution, and then values of X1 and Y1 for changing lightness and saturation are obtained based on the ink reduction rate.

However, it is possible to store values of X1 and Y1 for each combination of the type of image, the type of recording paper, and the printing resolution in the hard disk drive 14. In this case, the values of X1 and Y1 suitable for a combination of the type of image, the type of recording paper, and the printing resolution can be obtained without obtaining an ink reduction rate.

Alternatively, values of X1 and Y1 for each combination of the type of image and the type of recording paper may be stored in the hard disk drive 14 for each ink reduction rate, and the values of X1 and Y1 may be changed in accordance with printing resolution.

In the above-described embodiment, an ink reduction rate is set in accordance with the type of image, the type of recording paper, and printing resolution. However, the ink reduction rate may be set in accordance with any one or two of these parameters.

In the above-described embodiment, a RGB value of print data is converted to XYZ values, and the XYZ values are converted into Lab values, and then the Lab values are converted into LHS values. However, the RGB value may be directly converted into the LHS values by referring to a look-up table, for example. Similarly, the LHS values may be directly converted back into the RGB value by referring to a look-up table, for example.

In the above-descried embodiment, the application program and the printer driver are configured to be separate programs. However, the application program and the printer driver may be configured as a single program. In this case, the paper size and layout on the recording paper may be set on the ink reduction parameter setting screen 28, in addition to the type of recording paper and printing resolution.

In the above-described embodiment, the type of recording paper is set on the ink reduction parameter setting screen 28. However, a detector for automatically detecting the type of recording paper may be provided in the printer 20. In this case, an ink reduction rate or the values of X1 and Y1 may be set in accordance with the type of recording paper detected by the detector.

What is claimed is:

1. A non-transitory computer readable storage medium storing a data processing program for controlling a computer to perform steps comprising:
   a) inputting data;
   b) determining an ink reduction rate based on the type of recording medium onto which the data is to be printed;
   c) acquiring a lightness value and a saturation value by converting the data;
   d) acquiring a saturation modification value and a lightness modification value based on the ink reduction rate;
   e) modifying the lightness value into a modified saturation value based on the lightness modification value, and modifying the saturation value into a modified saturation value based on the saturation modification value; and
   f) calibrating the data based on both the modified lightness value and the modified saturation value.

2. The storage medium according to claim 1, wherein the data processing program further comprises g) setting the type of recording medium onto which the data is to be printed, wherein the ink reduction rate is determined in the program of b) based on the type of recording medium set in the program of g).

3. The storage medium according to claim 1, wherein the data processing program further comprises g) setting a printing resolution with which the data is to be printed, wherein the ink reduction rate is determined in the program of b) based further on the printing resolution.

4. The storage medium according to claim 1, wherein the data comprises a plurality of pixel values corresponding to a plurality of pixels,
   wherein the acquiring c) acquires the lightness value and the saturation value for each of the plurality of pixels by converting corresponding one of the plurality of pixel values,
   wherein the modifying e) modifies the lightness value for each of the plurality of pixels into a modified lightness value based on the lightness modification value, and modifies the saturation value for each of the plurality of pixels into a modified saturation value based on the saturation modification value; and
   wherein the calibrating f) calibrates the data based on both the modified lightness value and the modified saturation value for each of the plurality of pixels,
   wherein when the type of recording medium is a first type, the calibrating f) calibrates a specific pixel value into a calibrated specific pixel value such that the calibrated specific pixel value indicates a first type of dot to be ejected onto the recording medium,
   wherein when the type of recording medium is a second type different from the first type, the calibrating f) calibrates the specific pixel value into a calibrated specific pixel value such that the calibrated specific pixel value indicates a second type of dot to be ejected onto the recording medium,
   wherein the second type of dot is different from the first type of dot.

5. A data processing device comprising:
   an inputting unit configured to input data;
   a determining unit configured to determine an ink reduction rate based on the type of recording medium onto which the data is to be printed;
   a first acquiring unit configured to acquire a lightness value and a saturation value by converting the data;
   a second acquiring unit configured to acquire a saturation modification value and a lightness modification value based on the ink reduction rate;
   a modifying unit configured to modify the lightness value into a modified lightness value based on the lightness modification value and modify the saturation value into a modified saturation value based on the saturation modification value; and
   a calibrating unit configured to calibrate the data based on both the modified lightness value and the modified saturation value.

6. The data processing device according to claim 5, further comprising a first setting unit configured to set the type of recording medium onto which the data is to be printed, wherein the determining unit determines the ink reduction rate based on the type of recording medium set by the first setting unit.

7. The data processing device according to claim 5, further comprising a second setting unit configured to set a printing resolution with which the data is to be printed, wherein the determining unit determines the ink reduction rate based further on the printing resolution.

* * * * *